United States Patent [19]
Terme

[11] Patent Number: 6,038,640
[45] Date of Patent: Mar. 14, 2000

[54] COMPUTER MODULE HAVING REMOVABLE REMOTELY PROGRAMMABLE NON-VOLATILE MEMORY

[75] Inventor: Jean-Louis Terme, Plaisance du Touch, France

[73] Assignee: Aerospatiale Societe Nationale Industrielle, France

[21] Appl. No.: 08/847,382

[22] Filed: Apr. 24, 1997

[30] Foreign Application Priority Data

Apr. 25, 1996 [FR] France ................................. 96 05213

[51] Int. Cl.[7] ..................................................... G06F 12/00
[52] U.S. Cl. ........................... 711/115; 711/103; 713/200; 701/115; 710/13
[58] Field of Search ............................... 361/790; 365/52; 395/750.05; 705/403; 711/164, 115, 103, 163; 701/24, 99, 115; 713/200; 710/13, 62

[56] References Cited

U.S. PATENT DOCUMENTS

| | | | |
|---|---|---|---|
| 4,752,911 | 6/1988 | Prevost et al. | 365/52 |
| 5,181,107 | 1/1993 | Rhoades | 348/13 |
| 5,309,363 | 5/1994 | Graves et al. | 705/403 |
| 5,367,571 | 11/1994 | Bowen et al. | 380/20 |
| 5,491,827 | 2/1996 | Holtey | 711/163 |
| 5,574,859 | 11/1996 | Yeh | 710/101 |
| 5,659,705 | 8/1997 | McNutt et al. | 711/115 |
| 5,663,901 | 9/1997 | Wallace et al. | 365/52 |
| 5,734,860 | 3/1998 | Kondo | 711/115 |
| 5,758,174 | 5/1998 | Crump et al. | 395/750.05 |
| 5,802,325 | 9/1998 | Roux | 710/102 |
| 5,802,558 | 9/1998 | Pierce | 711/115 |
| 5,812,762 | 9/1998 | Kim | 713/200 |
| 5,841,638 | 11/1998 | Purdom et al. | 361/790 |
| 5,887,269 | 3/1999 | Brunts et al. | 701/208 |
| 5,914,471 | 6/1999 | Pavert | 235/380 |
| 5,928,347 | 7/1999 | Jones | 710/129 |

FOREIGN PATENT DOCUMENTS

| | | |
|---|---|---|
| 0 489 227 | 6/1992 | European Pat. Off. . |
| 0 537 688 | 4/1993 | European Pat. Off. . |
| 0 606 771 | 7/1994 | European Pat. Off. . |

*Primary Examiner*—John W. Cabeca
*Assistant Examiner*—Pierre-Michel Bataille
*Attorney, Agent, or Firm*—Marshall, O'Toole, Gerstein, Murray & Borun

[57] ABSTRACT

Computational rig (20) consisting of two distinct parts (2, 21), linked together in a removable manner by cooperating contactors (9, 16), said parts respectively including the central processing unit (6) and a non-volatile memory block (12A) supporting the software program of said computational rig.

According to the invention, said non-volatile memory (12A) is electrically erasable and programmable and the part (21) moreover includes:

a memory (22) supporting a program for loading said software program into the memory block (12A);

means (23) of connection of the part (21) to a communication channel (24); and a bidirectional communication peripheral device (25), arranged between the means of connection (23) and the loading memory (22).

6 Claims, 2 Drawing Sheets

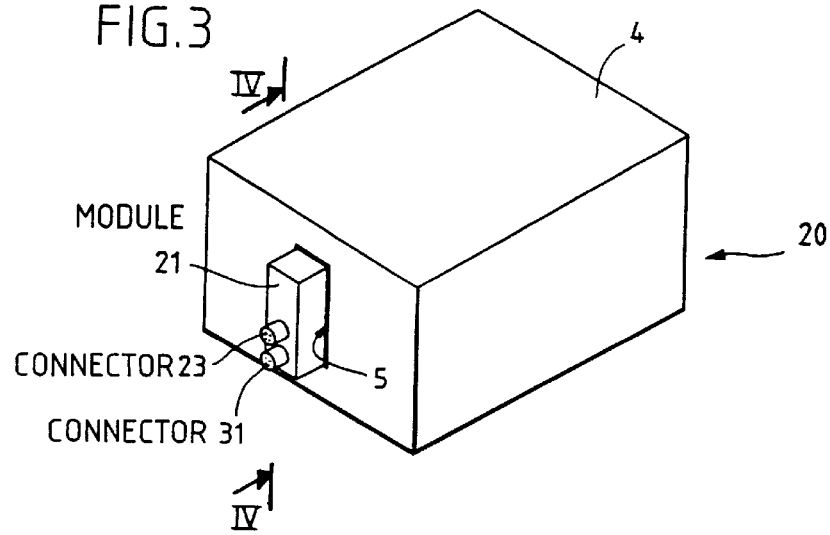
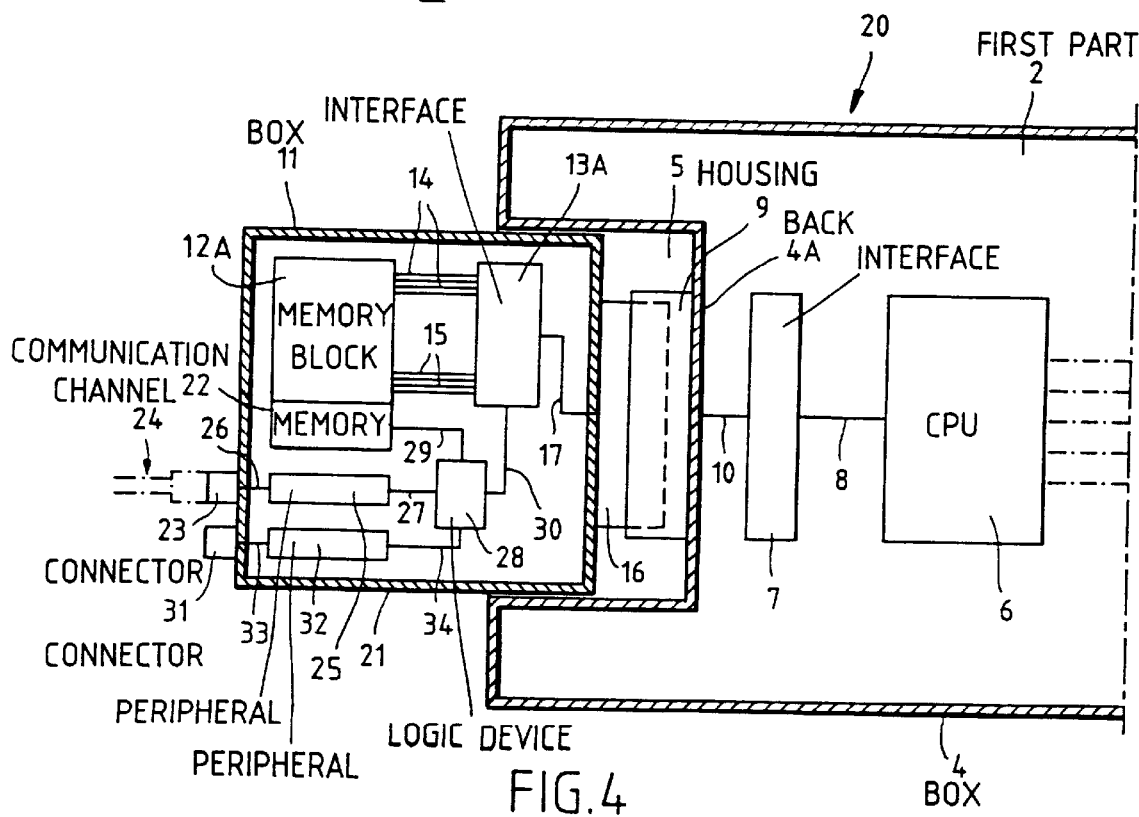

COMPUTER MODULE HAVING REMOVABLE REMOTELY PROGRAMMABLE NON-VOLATILE MEMORY

BACKGROUND OF THE INVENTION

The present invention relates to computational rigs stowed on board aircraft.

It is known that, in such a computational rig, the software program, intended to implement the various functions which said rig is to perform, is supported by a memory block comprising at least one non-volatile electronic memory, that is to say one which ensures the remanence of the information which it contains in the absence of electrical supply. It is known moreover that this software program is not frozen over time, but that, on the contrary, it undergoes upgrades intended to improve the operation of said rig.

Thus, there is cause to modify the software program of said memory block.

To do this, the basic solution consists in dismantling said computational rig from the aircraft and removing it to a workshop, where it is opened to allow the replacement or reprograming of said memory block, and in then refitting said computational rig on the aircraft. It goes without saying that such a solution is neither easy nor rapid. Moreover, it is expensive since the de-installing of the computational rig entails the brief but total unavailability of the aircraft.

SUMMARY OF THE INVENTION

To alleviate these drawbacks, there is cause to modify the structure of said on-board computational rigs. For this purpose, each computational rig consists of two distinct parts, linked together in a removable manner, the first of these parts including, among other things, the central processing unit of said computational rig, first means of connection and a first electronic interface device arranged between said first means of connection and said central processing unit, while the second of said parts includes the memory block comprising at least one non-volatile memory supporting all or part of the software program of said computational rig, second means of connection complementary to said first means of connection and a second electronic interface device arranged between said second means of connection and said memory block and able to cooperate with said first electronic interface device, through said first and second means of connection.

Thus, said second part can be embodied in the form of a module, generally termed an OBRM (On Board Replaceable Module) module, which can be attached to or separated from said first part, preferably by plugging-in and interlocking. This OBRM module, which supports said memory block, is therefore physically extractable from said first part which includes the central processing unit. When a modification has to be made to the software program, this modification can be performed simply by exchanging one OBRM module for another, previously programed in the workshop. By virtue of the OBRM modules, it is therefore possible to avoid having to de-install, move, open, reclose and refit the computational rig, as has been described above with the drawbacks inherent in such a procedure.

The object of the present invention is to enhance such an OBRM module so as to even further improve the software program modification procedure, whilst leaving said first part of said computational rig unchanged, so that the new enhanced module according to the invention is totally compatible with said first part and can be simply mounted thereon in place of said OBRM module.

For this purpose, according to the invention, the two-part computational rig, of the type recalled above, is noteworthy:

in that said non-volatile memory supporting said software program is electrically erasable and programmable; and in that said second part moreover includes:

a loading memory associated with said memory block and supporting a loading program for entering said software program into said memory block;

third means of connection allowing the connection of said second part to a communication channel; and a first bidirectional communication peripheral device, arranged between said third means of connection and said loading memory and serving as support in the loading of the software program.

It is thus seen that said second part thus enhanced can form a remotely loadable module, that is to say one which can receive from outside, by way of said communication channel, the image of a new modified software program and, after erasure of the previous software program, can reprogram said non-volatile memory (for example of the Flash EEPROM type) of said memory block with said new software program. Such a module, which may be termed OBMM (On Board Modifiable Module) by analogy with the known OBRM modules, therefore exhibits, with respect to these latter, greater flexibility of intervention, a reduction in the intervention time-scales and a reduction in the hardware stock costs. Moreover, it requires no modification of said first part, so that an OBMM module in accordance with the invention can replace, by straightforward exchange, an earlier OBRM module so as to afford a modification to the software program of the rig. It is therefore possible to update, as regards said software program, the old rigs while minimizing:

the development costs of the software modifications,
the costs and time-scales of modifying the rigs,
the costs and time-scales of modifying the aircraft, as well as while rendering said old rigs compatible with future architectures based on remote loading.

Advantageously, said second part moreover includes:

fourth means of connection making it possible to receive information for authorizing the loading of said software program into said loading memory;

a second authorization information acquisition peripheral device, linked to said fourth means of connection; and a logic device, linked to said second peripheral device and authorizing the loading of said software program into said loading memory, only when said authorization information is present on said fourth means of connection.

Moreover, it may be advantageous for said logic device to authorize operation of said second peripheral device only when said authorization information is present on said fourth means of connection.

Thus, it is possible to render said loading memory, and possibly said first peripheral device, totally inaccessible while said authorization information is not present, and hence to enable or disable the phase of loading of said software program at will.

It will be observed, as a variant, that said authorization information, instead of arriving directly on said fourth means of connection, that is to say on the module itself, could be delivered by said rig.

Furthermore, said loading memory can, either be distinct from said memory block or be formed by a part of the latter.

Preferably, each of the two parts of said computational rig is enclosed in a box and said first and second means of connection are respectively mounted on the box of said first part and on the box of said second part, in such a way that said second part (OBMM module) can be plugged into said first part.

Moreover, the box of said first part may include a housing with which the box of said second part can be interlocked.

BRIEF DESCRIPTION OF THE DRAWINGS

The figures of the appended drawing will elucidate the manner in which the invention may be embodied. In these figures, identical references denote similar elements.

FIG. 3 is a diagrammatic perspective view of a computational rig for aircraft, in accordance with the present invention.

FIG. 4 is an enlarged and partial diagrammatic longitudinal sectional view along the line IV—IV of FIG. 3.

DETAILED DESCRIPTION OF A PREFERRED EMBODIMENT

Figure 1:
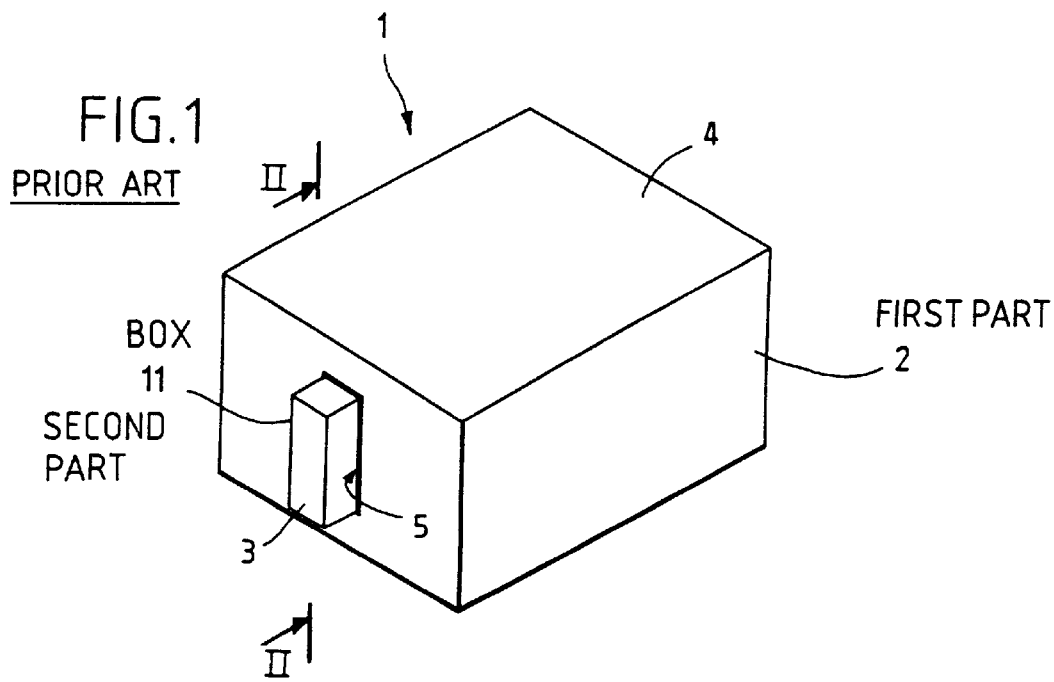
FIG. 1 is a diagrammatic perspective view of a computational rig for aircraft, of known type.
Figure 2:
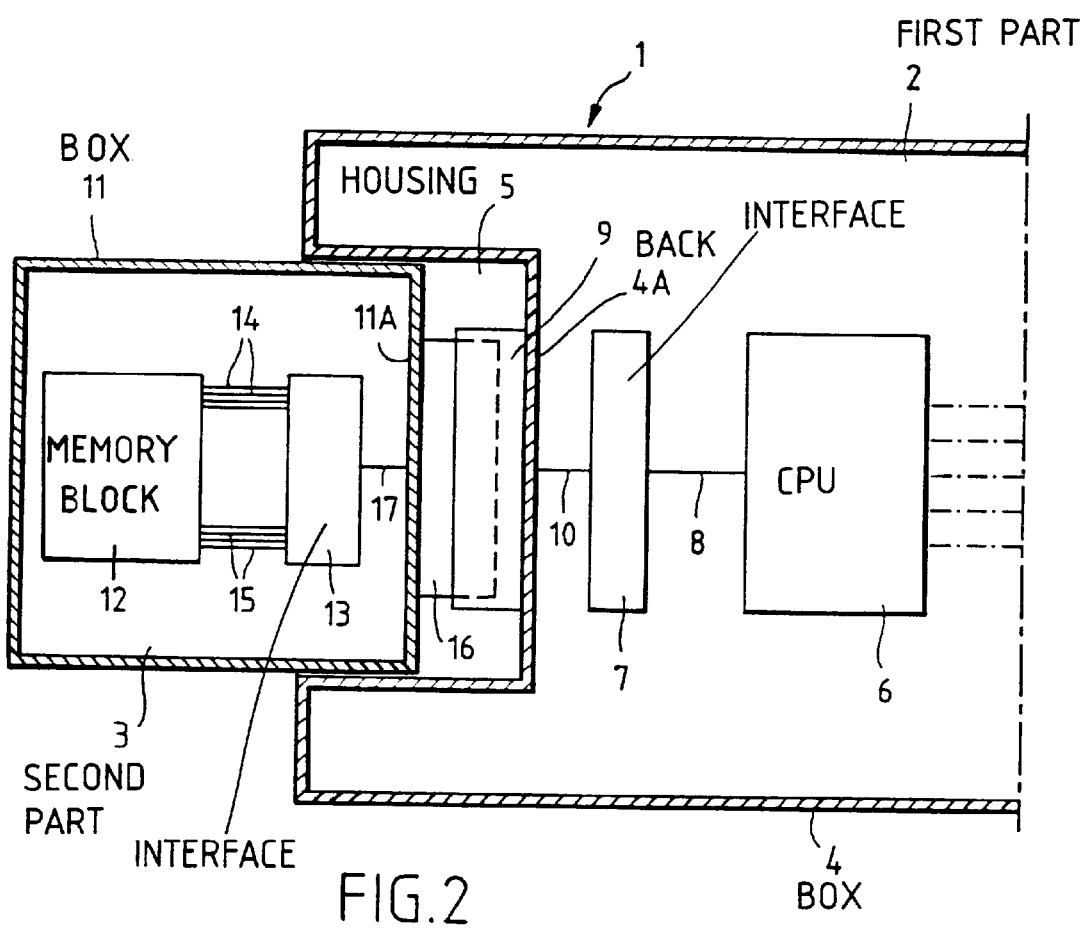
FIG. 2 is an enlarged and partial diagrammatic longitudinal sectional view along the line II—II of FIG. 1.

The known computational rig 1, shown by FIGS. 1 and 2, consists of two distinct parts 2 and 3 linked, electrically and mechanically, to one another in a removable manner.

The first part 2 includes a box 4 defining a housing 5 into which the second part 3 can be partially or fully introduced. The box 4 encloses, among other things, a central processing unit 6 and an electronic addressing interface 7, which are electrically linked to one another by a link 8. At the back 4A of the housing 5 is fixed a connector 9, linked to the interface 7 by a link 10.

The second part 3 includes a box 11 enclosing a memory block 12 comprising at least one non-volatile memory supporting the software program for the rig 1, and an electronic addressing interface 13, linked to said memory block 12 by data links 14 and addressing links 15. On its outside face 11A, pointing toward the housing 5, the box 11 includes a connector 16, complementary with the connector 9 and linked electrically to the interface 13 by a link 17.

The shape of the box 11 is such that said second part 3 can interlock with the housing 5. When said second part is interlocked fully with the housing 5, the connectors 9 and 16 cooperate, so that said first and second parts are then electrically and mechanically linked (the position represented in FIGS. 1 and 2). On the other hand, said second part can be extracted, by pulling, from the housing 5, so that the two parts 2 and 3 are then independent of one another.

The second part 3 therefore forms a module, termed OBRM, which can be attached to the first part 2. When the module 3 is joined, mechanically and electrically, to said first part, the computational rig 1, and especially its central processing unit 6, can operate the software program supported by the memory block 2, by virtue of the cooperation of connectors 9 and 16 and of that of the interfaces 7 and 13.

In the computational rig 20, in accordance with the invention and represented in FIGS. 3 and 4, are to be found identically the elements 2, 4 to 11 and 14 to 17 described above in respect of the known computational rig 1. Thus, the first part 2 of the rig 20 is identical to that of the rig 1. On the other hand the rig 20 includes, in place of the module 3, a different module 21. This module 21 includes:

a memory block 12A, differing from the memory block 12 in that the non-volatile memory or memories which it includes are electrically erasable and programmable, for example of the Flash EEPROM type;

an interface 13A, differing from the interface 13, so as to be able to ensure, in addition to the functions of said interface 13, dialog with the logic device 28, described below; additional elements, namely:

a memory 22 associated with said memory block 12A and supporting a loading program for entering the software program of said computational rig 20 into said memory block 12A;

a connector 23, integral with the box 11 and accessible from outside when said module 21 is in place in the housing 5, and intended to be linked to an exterior communication channel 24, for example a high-speed serial computer link, capable of conveying said software program;

an electronic peripheral 25 for bidirectional communication with the outside, linked to the connector 23 by a link 26 and able to receive said software program;

a logic enabling device 28, authorizing or disallowing the loading of the software program into said memory 22, said logic device 28 being linked to the peripheral 25, to the memory 22 and to the interface 13A respectively by the links 27, 29 and 30;

a connector 31, integral with the box 11 and accessible from outside when the module 21 is in place in the housing 5 and intended to receive information making it possible to enable or disable the loading of the software program into the memory 22; and an electronic peripheral 32, linked to the connector 31 by a link 33 and to the logic device 28 by a link 34.

It will be understood that the software program for the computational rig 20 can thus be entered and/or modified in the memory 22 via the communication channel 24, the connector 23, the link 26, the electronic peripheral 25, the link 27, the logic device 28, the link 29 and the memory 22, under the control, on the one hand, of the addressing interface 13A (link 30) and, on the other hand, of the authorization or disabling information travelling via the connector 31, the link 33, the electronic peripheral 32 and the link 34.

In FIG. 4, the loading memory 22 has been represented as being distinct from the memory block 12A. of course, this memory 22 could be formed by a part of said memory block, and therefore reprogrammable.

Similarly, the two connectors 23 and 31, instead of being distinct, as represented in FIGS. 3 and 4, could be brought together into a common connector. The information for enabling the loading of the software program could also originate from the computational rig 20, if the latter already generates it.

It may therefore be seen that, by virtue of the present invention, a plug-in module 21 is produced which is electrically and mechanically compatible with the earlier modules 3, but which can be remotely loaded by virtue of the elements 22 to 29, under the control of the elements 31 to 34.

I claim:

1. A computational rig (20) comprising:
   a first part (2) including:
      a central processing unit (6);
      first connection means (9); and
      a first electronic interface device (7) arranged between said first connection means and said central processing unit; and
   a second part (21) linked to said first part (2) in a removable manner so that said second part (21) may be removed from said first part without removal of a housing of said first part, said second part (21) including:
- a memory block (12A) comprising at least one electrically erasable and programmable non-volatile memory;
- at least part of a software program of said computational rig being stored in said memory block (12A);
- second connection means (16) complementary to said first connection means;
- a second electronic interface device (13A) arranged between said second connection means and said memory block and able to cooperate with said first electronic interface device through said first and second connection means;
- a loading memory (22) associated with said memory block (12A);
- a loading program associated with said loading memory (22) for entering said software program into said memory block (12A);
- third connection means (23) allowing the connection of said second part (21) to a communication channel (24); and
- a bidirectional communication peripheral device (25), arranged between said third connection means (23) and said loading memory (22) and serving as support in the loading of said software program, said second part (21) additionally comprising:
- fourth connection means (31) making it possible to receive information for authorizing loading of said software program into said loading memory (22);
- a authorization information acquisition peripheral device (32), linked to said fourth connection means (31); and
- a logic device (28), linked to said authorization information acquistion peripheral device (32), which authorizes the loading of said software program into said loading memory (22) only when said authorization information is present via said fourth connection means (31).

2. The computational rig as claimed in claim 1, wherein said logic device (28) authorizes operation of said second peripheral device (32) only when said authorization information is present via said fourth connection means (31).

3. The computational rig as claimed in claim 1, wherein said loading memory (22) is distinct from said memory block (12A).

4. The computational rig as claimed in claim 1, wherein said loading memory (22) forms part of said memory block (12A) and is reprogrammable.

5. The computational rig as claimed in claim 1, wherein said first part (2) is enclosed in a first box (4), wherein said second part (21) is enclosed in a second box (11), wherein said first connection means (9) is mounted on said first box (4), wherein said second connection means (16) is mounted on said second box (11), so that said second part (21) forms a plug-in module for said first part (2).

6. The computational rig as claimed in claim 5, wherein said first box (4) of said first part (2) includes a housing (5) with which said second box (11) of said second part (21) can be interlocked.

* * * * *